(12) United States Patent
Rawlings et al.

(10) Patent No.: US 7,867,621 B2
(45) Date of Patent: Jan. 11, 2011

(54) WIDE AREA LIGHTNING DIVERTER OVERLAY

(75) Inventors: Diane C. Rawlings, Bellevue, WA (US); Bruce K. Keough, Kent, WA (US)

(73) Assignee: The Boeing Company, Chicago, IL (US)

( * ) Notice: Subject to any disclaimer, the term of this patent is extended or adjusted under 35 U.S.C. 154(b) by 1004 days.

(21) Appl. No.: 11/229,911

(22) Filed: Sep. 19, 2005

(65) Prior Publication Data

US 2006/0051592 A1 Mar. 9, 2006

Related U.S. Application Data

(63) Continuation-in-part of application No. 10/941,429, filed on Sep. 15, 2004.

(60) Provisional application No. 60/507,546, filed on Sep. 30, 2003.

(51) Int. Cl.
*B32B 15/00* (2006.01)
*B32B 15/02* (2006.01)
*B32B 15/08* (2006.01)
*B32B 27/14* (2006.01)

(52) U.S. Cl. ............... 428/457; 428/458; 428/425.9

(58) Field of Classification Search ........ 428/423.1, 428/423.5, 423.7, 457, 458, 451, 425.8, 425.9
See application file for complete search history.

(56) References Cited

U.S. PATENT DOCUMENTS

| | | | |
|---|---|---|---|
| 2,625,496 A | | 1/1953 | Swift et al. |
| 3,238,087 A | | 3/1966 | Norwalk et al. |
| 3,438,127 A | * | 4/1969 | Lehtonen ............... 29/848 |
| 3,528,165 A | | 9/1970 | Williams et al. |
| 4,043,878 A | * | 8/1977 | Ehrsam ............... 205/109 |
| 4,186,237 A | | 1/1980 | Propp |
| 4,352,142 A | | 9/1982 | Olson |
| RE31,780 E | | 12/1984 | Cooper et al. |
| 4,645,697 A | * | 2/1987 | Torigoe ............... 428/43 |
| 4,986,496 A | | 1/1991 | Marentic et al. |
| 5,158,831 A | | 10/1992 | Schirmer |
| 5,219,629 A | | 6/1993 | Sobolev |
| 5,451,252 A | * | 9/1995 | Elfenthal et al. ........ 106/436 |
| 5,468,699 A | * | 11/1995 | Zhang et al. ........... 502/60 |
| 5,616,420 A | | 4/1997 | Yamaoka et al. |
| 5,660,667 A | | 8/1997 | Davis |
| 5,872,415 A | * | 2/1999 | Dreifus et al. ........ 310/311 |
| 6,136,441 A | | 10/2000 | MacGregor et al. |
| 6,168,732 B1 | * | 1/2001 | Ardakani et al. ........ 252/500 |
| 6,177,189 B1 | | 1/2001 | Rawlings et al. |
| 6,280,671 B1 | | 8/2001 | Benz et al. |
| 6,451,441 B1 | | 9/2002 | Nishimoto et al. |
| 6,258,918 B1 | | 3/2004 | Ho et al. |
| 7,050,286 B2 | | 5/2006 | Pridham et al. |
| 2002/0081921 A1 | * | 6/2002 | Vargo et al. ........... 442/16 |
| 2004/0229607 A1 | | 11/2004 | La Chapelle et al. |

FOREIGN PATENT DOCUMENTS

| | | |
|---|---|---|
| EP | 0119780 | 9/1984 |
| EP | 0522240 | 1/1993 |
| EP | 0522663 | 1/1993 |
| EP | 1332867 | 8/2003 |
| GB | 1580321 | 12/1980 |
| WO | WO/90/01857 | 2/1990 |
| WO | WO/99/65674 | 12/1999 |
| WO | WO/00/67994 | 11/2000 |

OTHER PUBLICATIONS

European Patent Office, International Search Report, International Application No. PCT/US2004/030251, May 24, 2005 (.
Dan Holt, Paintless Aircraft Technology, Aerospace Engineering, Nov. 1997.
Aerospatiale Matra CCR, Final Report for Publication—Fulmen Project, Contract n°AI-95-SC.204, Mar. 12, 2002.

* cited by examiner

*Primary Examiner*—James Seidleck
*Assistant Examiner*—Saira Haider
(74) *Attorney, Agent, or Firm*—Toler Law Group (57) ABSTRACT

An overlay of patterned metal foil above a substrate to be protected supports development of localized coronas after a lightning strike. The localized coronas transport energy of a lightning strike above the substrate's surface with limited removal of metal foil from the lightning strike attachment point. A first polymer film underlies patterned metal foil. A topcoat overlies the patterned metal foil. An adhesive, underlying the first polymer film affixes the lightning diverter overlay to the substrate. If desired, semiconductor particulates may be dispersed throughout the second polymer film to contribute to instantaneous generation of localized coronas. Also, an ink layer may be provided between the patterned metal foil and the topcoat or on the exterior, if desired, for aesthetic and/or anti-static purposes.

22 Claims, 8 Drawing Sheets

WIDE AREA LIGHTNING DIVERTER OVERLAY

CROSS-REFERENCE TO RELATED APPLICATIONS

This Application is a Continuation-In-Part (CIP) application of application Ser. No. 10/941,429 filed on Sep. 15, 2004, which is a Non-Prov of Prov (35 USC 119(e)) application 60/507,546 filed on Sep. 30, 2003, the contents of both of which are incorporated by reference.

FIELD OF THE INVENTION

The present invention relates generally to appliqués and, specifically, to appliqués for protection against lightning strike.

BACKGROUND OF THE INVENTION

Painting has long been the process of choice for applying coatings to surfaces, especially those having complex curvature. Painting is generally a controllable, reliable, easy, and versatile process. The paint can include additives to give the surface desired physical properties, such as gloss, color, reflectivity, or combinations thereof. The painting process is well understood and produces quality coatings having uniform properties even when the surface includes complex curvature. However, painting is falling under closer environmental scrutiny because paints use volatile solvents to carry the binder and pigments or because of the binder precursors and pigments themselves. Therefore, there is a need to replace the painting process with a process that has less environmental impact. Furthermore, while painting is well defined, well understood, and common, it remains an "art" where masters produce better products than novices or apprentices without necessarily being able to account for why or to teach others how.

Painted surfaces sometimes lack the durability that quality-conscious customers demand. The surface must be treated and cleaned prior to applying the paint. The environment surrounding the part must be controlled during application of the coating, often requiring a spray booth. Painted coatings are also vulnerable to damage like cracks or scratches. Isolated damage may require the repair of a large area, such as forcing the repainting of an entire panel.

Spraying inherently wastes paint and is unpredictable because of the "art" involved with the application. Improper application cannot be detected until the spraying is complete, then rework to correct a defect usually affects a large area even for a small deficiency. Furthermore, in the aerospace industry, painting requires specialized equipment and facilities that are expensive to construct and to operate. Painting takes an aircraft out of revenue-generating service. Painting can only be done where a paint hangar is available, and is relatively slow and inflexible.

In the context of aircraft, U.S. Pat. No. 4,986,496, the contents of which are incorporated by reference, describes a drag reduction article in the form of a conformable sheet material (a decal) with surface texturing for application to aircraft flow control surfaces to reduce aircraft drag. The material fits on curved surfaces without cracks, bubbles, or wrinkles because of paint-like properties of the basic carrier film. The decals are manufactured flat and are elongated to fit the intended curvature. If the appliqué deformation is not plastic, this elongation can be problematic over time if the stretched material shrinks to expose a gap between adjacent decals where weather can attack the decal-surface interface. Appliqués or decals must be plastically deformable or they will be limited to surfaces of slowly changing curvature.

Appliqués (i.e. decals) are also described in U.S. Pat. No. 5,660,667, the contents of which are incorporated by reference. Having complex curvature, the appliqués form complete, bubble-free, wrinkleless coverings on surfaces of complex curvature without excessive elongation. Lapping of appliqués is generally described in European Patent Application publication no. 1093409, the contents of which are incorporated by reference.

Often surfaces must be protected against corrosion. Such protection commonly involves surface treatments or primers (i.e. chromated primers or conversion coatings) that are relatively expensive because of the chemicals involved and the time associated with their application. These traditional coatings are relatively heavy, especially when coupled with other surface coatings that must be applied over the corrosion protection coating to provide color, gloss, enhanced surface durability, abrasion protection, a combination of these attributes, or other attributes. The chemicals used in conventional corrosion protection coatings often are hazardous materials.

Appliqués are of considerable interest today for commercial and military aerospace applications. Flight tests have been conducted on paintless aircraft technologies, such as appliqués. These appliqués save production costs, support requirements, and aircraft weight while providing significant environmental advantages. Some of these appliqués are described in greater detail in U.S. Pat. No. 6,177,189 and in an article entitled "Paintless aircraft technology," Aero. Eng'g, November 1997, p. 17, which are incorporated by reference. Further, some commercial airlines, like Western Pacific, use appliqués to convert their transports into flying billboards.

In addition to the above advantages, appliqués incorporating metal layers may also provide protection against lightning strike. A description of an appliqué providing protection against lightning strike is described in U.S. Pat. No. 4,352,142, which is incorporated by reference. Lightning strikes may potentially cause damage to aircraft—especially composite aircraft. A typical lightning strike on an aircraft may initially attach at a location such as a leading edge of an engine inlet cowl or the nose of the fuselage, collectively referred to as Zone 1. An initial Zone 1 lightning strike may be a rapid spike of electrical current with a peak amplitude on the order of around 200 KA that may last for around 500 µSec or so (referred to as an "A" waveform).

As the aircraft flies through the plasma field of the lightning, the lightning may reattach aft of the Zone 1 strike at locations such as an engine exhaust outlet (referred to as Zone 2) or on a wing skin (referred to as Zone 2 or 3 depending on the location). Zone 2 reattachment can experience a continuing current charge transfer of up to about 10 coulombs over a period of time on the order of around 5 milliSec or so (referred to as a "B" waveform). Zone 3 reattachment can experience a continuing current charge transfer of up to about 200 coulombs over a period of time between around 0.25 Sec and around 1 Sec or so (referred to as a "C" waveform).

A restrike can occur at any Zone and is referred to as a "D" waveform. A "D" waveform restrike may be a rapid spike of electrical current with a peak amplitude on the order of around 100 KA that may last for around 500 µSec or so.

A major concern is to protect against a "D" waveform restrike in Zones 2 or 3—especially in the vicinity of a fastener that extends into a wing box that may be wetted with fuel. Another concern is to mitigate damage to composites that may be caused by the continuing currents of the "B" and "C" waveforms.

For example, U.S. Patent Application Publication No. 2002/0081921 by Vargo et al. (the contents of which are incorporated by reference) describes an appliqué that includes a polymeric sheet material, such as a halopolymer fabric, that is adhered to or bonded to a metal layer, such as a metal mesh or an expanded metal foil. The metal layer is adhered directly with an adhesive to a nonmetallic substrate, such as a composite material used in an aircraft structure. In the event of a lightning strike, energy from the lightning is dispersed over a large surface area, thereby mitigating localized damage to the nonmetallic substrate. However, because the metal layer is adhered directly to the nonmetallic substrate, the energy from the lightning strike is maintained in contact with the nonmetallic substrate. As a result, a large surface of the nonmetallic substrate may be placed in contact with large amounts of energy from the lightning strike.

A concern with use of conductive elements such as expanded aluminum or copper foils or interwoven wire fabric (IWWF) incorporated as part of the skin of composite aircraft for lightning protection is cracking due to the differential coefficient of thermal expansion of the expanded metal and the resin/composite. Even micro-cracking in a composite may lead to further cracking and it is disallowed by FAA certification rules.

In addition, damage to internal structure of a composite aircraft and to the interior of the composite structure itself may be difficult to assess and repair, and may present a long-term aging issue for the aircraft. If composite structures are exposed to the high currents typically imparted by a lightning strike, then damage (such as charring, bond-breaking, loss of distortional capability) may occur to the resin. Another concern is reliably predicting where currents will go once an aircraft is struck by lighting. As a result, many areas of the structure are currently over-designed and many protection schemes are duplicated.

Further, lightning protection systems currently in use require a connected electrical path in order to transfer current. However, each fastener and panel joint is a discontinuity that presents an opportunity for the current to bury into and possibly damage the structure below or even ignite fuel carried within. Therefore, it would be desirable to allow the transfer of energy around or over these discontinuities, especially in the case where there is panel-to-panel motion.

It would also be desirable to mitigate effects of static charge developed during flight. As an aircraft flies through the air, electrons in air molecules may be forcibly dislodged from their orbits by impact with the skin of the aircraft. The electrons may be stored on the composite skin of the aircraft and impart a static charge, referred to as a P-static charge. This P-static charge may possibly result in personnel injury if a person were to contact an aircraft skin after landing but before the aircraft were electrically grounded. Further, discharge of the P-static charge may result in electrical noise that can interfere with electronic systems of the aircraft.

Accordingly, it may be desirable to increase lightning strike protection afforded by an appliqué and/or simultaneously mitigate static charging. However, there is an unmet need in the art for a low-cost appliqué that provides increased protection from lightning strike to an underlying surface, and/or that mitigates static charging.

SUMMARY OF THE INVENTION

Embodiments of the present invention provide appliqués that may be used as a surface coating, such as a low cost replacement for paint. Advantageously, the appliqués of the present invention provide a metal foil for protection against lightning strikes and/or mitigation of P-static charging. Further, the metal foil is spaced apart from an underlying substrate by a dielectric layer. As a result, the appliqués of the present invention provide increased protection from lightning strike than previous appliqués. The appliqués of the present invention could be well suited to aircraft and to many other areas, such as automobiles, boats, architectural coatings, and other commercial products.

According to a non-limiting embodiment of the present invention, an appliqué coating is provided for a substrate. The appliqué coating includes a metal foil and a first polymer film underlying the metal foil. A topcoat overlying the metal foil may be provided as a layer of paint or as a second polymer film. An adhesive, such as a pressure sensitive adhesive, underlying the first polymer film may be provided to affix the appliqué coating to the substrate. If desired, fibers may be dispersed throughout the second polymer film to provide anti-static properties. Also, an ink layer may be provided between the metal foil and the second polymer film, if desired, for aesthetic and/or anti-static purposes.

According to aspects of the present invention, the metal foil includes aluminum foil but may also include copper or other metals. The first polymer film may include any one or a combination of polyamide (nylon), poly ether ether ketone (PEEK), polysulfonate, polyesters such as poly ethylene terephthalate (PET) or poly ethylene naphthalate (PEN), polyimide, polyolefins such as polyethylene or polypropylene, polyurethane, halopolymer, and a two-layer polymer film combination such as a polyester/polyethylene combination, polyester/nylon combination, PEEK/polyethylene combination, and a PEEK/nylon combination. The second polymer film may include any one or a combination of polyurethane, polyamide (nylon), polyolefin, halopolymer including both plastics and elastomers, epoxy, fluorosilicone, fluorourethane, polyester, polyimide, poly ether ether ketone (PEEK), and polyurea. If desired, the second polymer film may be cast with a solvent to increase porosity, thereby enhancing static charge migration to the metal foil.

According to another embodiment of the present invention, an appliqué coating assembly is provided for a substrate that has a fastener extending therethrough. The appliqué coating assembly includes an appliqué coating and a dielectric layer underlying the appliqué coating. The dielectric layer is arranged to be interposed between the appliqué coating and a head of the fastener. The dielectric layer increases the dielectric withstand voltage over the fastener and can help increase protection against lightning strike in the vicinity of fasteners. This increased protection against lightning strike may be desirable, for example, for fasteners that extend through skin of an aircraft wing into a wing box that may be wetted with fuel.

Another embodiment forms an overlay of patterned metal foil above a substrate to be protected. This patterned metal foil supports development of localized coronas during a lightning strike. The localized coronas transport the energy of a lightning strike above the substrate's surface with very limited removal of metal foil from the location of attachment of the lightning strike or from surrounding regions. This embodiment is a two-dimensional lightning diverter overlay that can transport the energy of a lightning strike over a wide area via multiple pathways on a surface.

An exemplary lightning diverter overlay includes a patterned metal foil and a first polymer film underlying the patterned metal foil. The patterned metal foil may be patterned throughout, or the metal foil may be partially patterned. A topcoat overlying the patterned metal foil may be provided as a layer of paint or as a second polymer film. An adhesive, such as a pressure sensitive adhesive, underlying the first polymer film may be provided to affix the lightning diverter overlay to the substrate. If desired, semiconductor particulates may be dispersed throughout the second polymer film to contribute to instantaneous generation of localized coronas. Also, an ink layer may be provided between the patterned metal foil and the topcoat or on the exterior surface, if desired, for aesthetic and/or anti-static purposes.

According to aspects, the patterned metal foil may include a plurality of sections having a first thickness that are separated from each other by a plurality areas having a second thickness that is different from the first thickness. In one example, the first thickness of the sections may be a non-zero thickness, and the second thickness of the areas may be a non-zero thickness that is thinner than the first thickness or the second thickness may be zero. In another example, the sections may be voids (and the first thickness is therefore zero thickness) of any desired shape, and the areas that separate the voids may be a plurality of intersecting lines having finite widths and a non-zero second thickness.

This lightning diverter overlay embodiment may help prevent high currents from destroying critical structure or from accessing fasteners which penetrate composite fuel tanks, thereby reducing sparking and explosion hazards. The lightning diverter overlay embodiment could be used to help reduce induced currents on sensitive internal equipment, structure, hydraulic lines, or electrical lines by tailoring the current flow to travel on regions of the exterior surfaces away from such areas or equipment. This embodiment may also help control the flow of currents across the surface from the point of initial attachment (usually near the nose) to the exit point (usually near the tail of the aircraft) without "dumping" large currents into the structure or internal components.

The lightning diverter embodiment may also make it possible to provide lightning protection for radomes or antennas, especially communications antennas. This may also help reduce antenna integration issues by allowing current to transfer from the surface of the antenna to appliqués according to other embodiments described herein that cover the remainder of the aircraft skin.

DETAILED DESCRIPTION OF THE INVENTION

Figure 1:
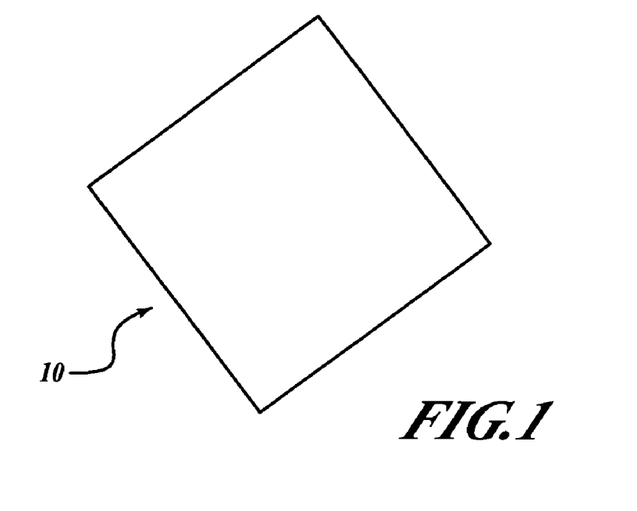
FIG. 1 is a schematic plan view of an appliquégore.
Figure 2:
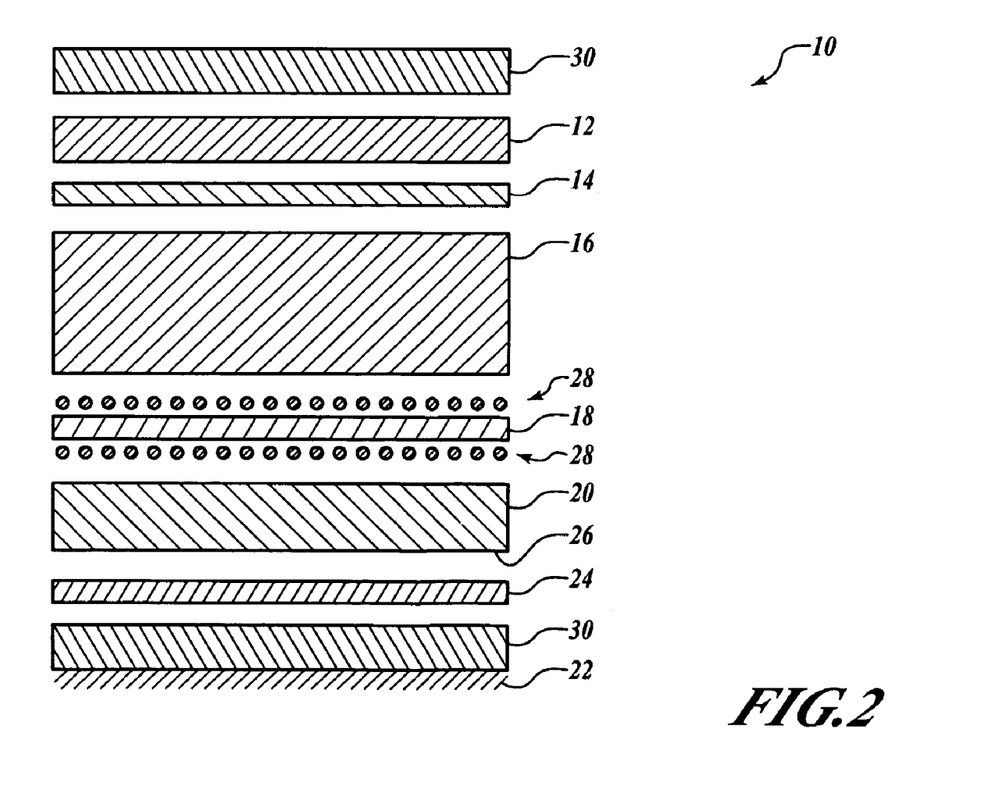
FIG. 2 is a schematic cross-section of the appliqué of FIG. 1.

By way of overview and referring to FIGS. 1 and 2, according to a non-limiting embodiment of the present invention, an appliqué coating 10 is provided for a substrate 22. The appliqué coating 10 includes a polymer film 12 arranged as an outer layer or topcoat and a vapor barrier film 18 made of metal foil. A pressure-sensitive adhesive 24 is arranged as another outer layer for adhesive attachment to the substrate 22. A polymer film 20 is disposed between the vapor barrier film 18 and the pressure-sensitive adhesive 24. FIG. 2 may not be drawn to scale in order to emphasize features that may enhance understanding of the present invention. Details will first be explained regarding exemplary components of the appliqué 10, followed by explanations of preferred and alternate implementations of appliqués according to exemplary embodiments of the present invention.

A polymer film 12 provides an external film or topcoat. The polymer film 12 is typically an organic resin matrix elastomeric composite. Given by way of non-limiting example, the polymer film 12 is suitably polyurethane, fluorinated urethane, polyurea, polyester, polyamide, PEEK, fluoropolymer or chloropolymer. The polymer film 12 is suitably tough, durable, and resistant to weather. For example, the polymer film 12 suitably provides increased durability and hardening to the vapor barrier film 18. Similarly, the polymer film 12 may be markable so that removable indicia can be imprinted thereon. Alternately, the polymer film 12 may be transparent. Transparency may be desired when color or graphic patterns are included in layers underneath the polymer 12. If desired, graphic patterns may be imbedded within the polymer film 12.

In addition, the polymer film 12 may contribute to aesthetic qualities, such as gloss or color through appropriate pigments. Generally, the pigments suitably are metal flakes, metal oxide particles, organic pigments or dies, or organometallic particles, and typically are mixtures of several types of material. Suitable aluminum flake pigments include the Aquasil BP series of pigments available from Siberline Manufacturing Co. The pigments might be glass, mica, metals (like nickel, cobalt, copper, bronze, and the like available from Novamet) or glass flake, silver coated glass flake, mica flake, or the like available from Potters Industries, Inc. These flakes typically are about 17-55 µm for their characteristic dimension. In some applications, ceramic pigments may be appropriate. The pigments can be mixed to provide the desired characteristics for the coating.

Titanox 2020 titanium oxide pigments are available from NL Industries. Copper oxide or iron oxide pigments are available from Fischer Scientific. NANOTEK titania, zinc oxide, or copper oxide pigments are available from Nanophase Technologies Corporation. These pigments are generally spherical with diameters in the range from about 30 µm (for the NANOTEK pigments) to micron sizes.

The polymer film 12 suitably may be made from polyurethane or fluorinated urethane, if desired. Alternately, as discussed above, the polymer film 12 may be a fluoropolymer or fluoroelastomer. One presently preferred topcoat of the polymer film 12 is a fluoroelastomer, such as a modified CAAP-COAT Type III or Type IV rain and thermal resistant fluoroelastomer available from the CAAP Company and suitable for roll coating in desired colors and with any desired additives (such as for anti-static characteristics, as described below). In addition, the polymer film 12 may be polyurethane, polyolefin, polyamide, polyimide, halopolymer, ethylene propylene rubber, epoxy, polyester (such as poly ethylene terephthalate (PET), poly ethylene naphthalate (PEN), or the like) fluorosilicone, polyether sulfone (PES), or poly ether ether ketone (PEEK). The polymer film 12 may be solvent cast, if desired. Fluoropolymers advantageously provide good water-shedding characteristics as well as increased resistance to fluids, such as hydraulic fluids like SKYDROL™, that may be present in or around aircraft. Polyamides, polyimides, polyesters, PEEK and the like also provide resistance to hydraulic fluids such as SKYDROL™. As also discussed above, the polymer film 12 suitably may also be a chloroelastomer. Regardless of the composition of polymer film 12, UV stability helps ensure long-term durability of the coating system provided by the appliqué 10.

The polymer film 12 is suitably a thin layer. For example, the polymer film 12 may be between 0.1-4 mils (0.0001-0.004 inch) thick. In one presently preferred embodiment, the polymer film 12 is around 1-2 mils thick. Thinner layers are desirable over thicker layers because of weight savings when the appliqué 10 is used on an aircraft.

Further, when the polymer film 12 is suitably thin and porous, the polymer film 12 can aid in anti-static properties of the appliqué 10. If desired, anti-static material may be disposed within the polymer film 12. For example, electrically conductive material, such as without limitation graphite fibers or metal fibers, may be dispersed throughout the polymer film 12. The fibers disperse and dissipate the P-static charge, thereby mitigating buildup of the P-static charge in a localized area. This dispersion and dissipation reduces the possibility of electrical discharge which is a source of electrical noise to various communication systems onboard aircraft during flight. This dispersion and dissipation also reduces the possibility of personnel injuries if a person contacts the skin of an aircraft after the aircraft lands but before the aircraft is electrically grounded.

If desired, an optional ink layer 14 may be provided. The ink layer 14 may provide a desired color and/or graphic design. Alternately, the ink layer 14 may provide color to the polymer film 12 that overlays the optional ink layer 14. Advantageously, the ink layer 14, if provided, may provide anti-static characteristics to the appliqué 10.

Alternately, it may be desirable in some cases to paint over the polymer film 12 instead of providing the ink layer 14. In these instances, the polymer film 12 may have a matte texture. The matte texture enhances adhesion of paint to the polymer film 12.

If further desired, a polymer film 16 may be provided. The optional polymer film 16 may be used for any desired purpose. For example, a graphic image may be printed in the polymer film 16. The polymer film 16 may be made of the same materials and processed as discussed herein for the polymer film 12.

The polymer films 12 and 16 may be extruded or cast. When the polymer films 12 and 16 are cast with solvent, the polymer films 12 and 16 are microporous and can provide a path for migration of P-static charges to the vapor barrier film 18. As a result, the vapor barrier film 18 can provide anti-static characteristics. Regardless of the static charge transport mechanism, the static charge advantageously is dispersed over a wide area. As discussed above, this dispersion helps reduce the possibility of induction of electrical noise in electronic circuits inside the aircraft during flight and also helps reduce possibilities of personnel injuries if a person contacts the skin of an aircraft after the aircraft lands but before the aircraft is electrically grounded.

Advantageously, according to embodiments of the present invention, the vapor barrier film 18 is made of a metal foil. Given by way of non-limiting example, the metal suitably includes aluminum, such as aluminum foil. For optimum use as a vapor barrier and for protecting against lightning strike, the vapor barrier 18 should permit the appliqué 10 to elongate and to conform to surfaces of compound curvature. Given by way of non-limiting example, high-quality foil such as rolled aluminum foil may be used as the vapor barrier 18. Foil with a thickness between around 0.1 mil and around 0.75 mil suitably may be used, and foil with a thickness between around 0.25 mil and around 0.5 mil is presently preferred.

However, the vapor barrier film 18 may be made of any metal foil as desired, such as without limitation, copper, nickel, gold, or titanium: Because the vapor barrier film 18 is a metal foil, the vapor barrier film 18 advantageously is provided at low cost. Also, the metal foil provides increased integrity over vapor barriers that may be provided via metallized deposition, such as physical vapor deposition or sputtering, or via expanded mesh. Because metal foil is readily available, the vapor barrier film 18 costs less than metallized vapor barriers that entail deposition in a vacuum chamber. Further, because the metal foil is metal instead of a metallized material or expanded mesh, the vapor barrier film 18 provides increased conductivity and uniformity over metallized vapor barriers or expanded mesh. While the vapor barrier film 18 may be thicker than metallized vapor barriers, thickness of the vapor barrier film 18 nonetheless may be less than 1 mil thick. For example, in one present embodiment, the vapor barrier film 18 may be less than around 0.3 mils thick.

Advantageously, the vapor barrier film 18 also provides anti-static properties and provides elongation control and stiffness to the appliqué 10. In one exemplary embodiment, the vapor barrier film 18 allows substantial elongation, on the order of around ten percent to around forty-five percent, during application of the appliqué 10 to a complex shape. In addition, the vapor barrier 18 advantageously provides complete UV opacity and, as a result, UV protection for an underlying composite structure.

Advantageously, according to embodiments of the present invention a polymer film 20 underlies the vapor barrier film 18. The polymer film 20 suitably is made from any of the same materials as the polymer film 12 or the polymer film 16, as desired for a particular application. If desired, the polymer film 20 may also be a poly ether ether ketone (PEEK) film, polysulfonate, polyester, polyamide, polyimide, polyethylene, polypropylene or any combination thereof.

In one presently preferred embodiment, the polymer film 20 is made of nylon. Advantageously, nylon provides a moderately high dielectric strength of approximately 385 volts per mil, is sufficiently resistant to hydraulic fluids such as SKYDROL™, can bind readily to other materials, and is available in high-quality, inexpensive films.

Alternately, the polymer film 20 may be made from a variety of other suitable materials. For example, the polymer film 20 can be made from polyimides. Advantageously, other materials can bond easily to polyimides. In addition, the polymer film 20 may be made from polyolefin, polyester, polyurethane, or halopolymer.

As a further example, the polymer film 20 can be polyethylene or polyester for applications typically in use in a wide range of temperatures, such as temperatures between around 70 degrees Fahrenheit and around 180 degrees Fahrenheit. Advantageously, plasma treating has been shown to effectively enhance bond strength of polyethylene and polyester to each other and to adhesives at low temperatures.

As another example, the polymer film 20 may be a two-layer polymer film combination. Given by way of non-limiting examples, the polymer film 20 may be a polyester/polyethylene combination, a polyester/nylon combination, a PEEK/polyethylene combination, a PEEK/nylon combination, or the like.

It is not necessary that the polymer film 20 be made from the same exact materials as the polymer film 12. Likewise, the polymer film 20 may be cast, extruded, or provided as a laminate, as desired. The polymer film 20 advantageously supports the vapor barrier film 18. Additionally, when the polymer film 20 optionally is a high modulus plastic, the polymer film 20 provides stiffness and elongation to the appliqué 10. The preferred thermoplastic polymer film 20 is low-cost, provides high dielectric strength, and is substantially free of holes for either air or other fluids, such as solvents, or electrical charge to be transported through.

If desired, any of the polymer films 12, 16, and/or 20 and/or the vapor barrier 18 may be plasma treated to enhance bonding. In a presently preferred embodiment, atmospheric treatment is preferred. The plasma treatment is performed in oxygen or another gaseous chemical.

According to embodiments of the present invention, the vapor barrier film 18 and the polymer film 20 cooperate to contribute to protection against lightning strike. Advantageously, laboratory testing has shown that the appliqué 10 provides superior lightning strike protection. In the event of a lightning strike, according to the present invention the vapor barrier film 18 and the polymer film 20 act in concert to keep energy from the lightning strike away from an underlying substrate 22, such as an aircraft skin. Embodiments of the present invention are thus well-suited to be applied to composite panels, such as without limitation fiber-reinforced resin composite panels or carbon fiber-reinforced composite panels, that may be used for aircraft skin or other applications as desired.

When lightning strikes the appliqué 10, electrical charges that impact the vapor barrier film 18 advantageously do not penetrate the polymer film 20. The polymer film 20 prevents energy from the lightning strike from arcing directly through the appliqué 10 to the underlying substrate 22. Instead, the polymer film 20 permits the vapor barrier 18 to disperse electrical charges throughout the vapor barrier film 18. As a result, energy stays on the appliqué 10 and spreads out substantially uniformly. Testing has shown that the attachment point of the energy moves about the lightning strike location.

This dispersion distributes the energy of the lightning strike over a large area, thereby lowering the charge density in any localized area. This aids in mitigating likelihood of the lightning penetrating through the polymer film 20 to the substrate 22. If the electrical energy does find a path to underlying structure, then advantageously the appliqué 10 has distributed the energy into many different, lower energy paths into the structure. As a result of the distribution of charges by the vapor barrier 18, dielectric strength of the polymer film 20 advantageously has been shown to withstand energy expected in lightning strikes in Zone 1 as well as Zone 2. Because the polymer film 20 has been shown to not experience dielectric breakdown as a result of exposure to the charges dispersed by the vapor barrier 18, the polymer film 20 is able to keep the charge separated from (and out of electrical contact with) the substrate 22. As a result of protection afforded by the appliqué 10, nondestructive evaluation (by pulse echo techniques) has shown that the substrate 22 advantageously can experience no damage from energy expected in lightning strikes in Zone 1 as well as Zone 2.

Further, this dispersion causes the vapor barrier film 18 to "pull up" and disbond from the polymer film 20 in some areas adjacent the lightning strike location. It will be noted that testing has shown the vapor barrier 18 to vaporize at the location of the lightning strike. As a result, energy from the electrical charges advantageously is vertically spaced apart and kept away from the substrate 22, such as an aircraft skin, underlying the polymer film 20.

A pressure sensitive adhesive (PSA) 24 suitably provides complete adhesion between the appliqué 10 and the substrate 22. The PSA 24 desirably is an adhesive that is resistant to jet fuels, cleaning fluids, water, and high humidity environments. If possible, the adhesive should be resistant to aircraft hydraulic fluids, such as SKYDROL™. In one presently preferred embodiment, the PSA 24 is a pressure sensitive acrylic adhesive, such as adhesive A8 available from The Boeing Company of Seattle, Wash. Alternately, other acceptable adhesives include 52-4 or 86-02 from the 3M Company of St. Paul, Minn. The PSA 24 suitably holds the appliqué 10 on the substrate 22 during normal operation of a vehicle, such as flight of an aircraft. However, the PSA 24 is also desirably peelable for replacement of the appliqué 10 without leaving a residue on the substrate 22.

Advantageously, thickness of the PSA 24 contributes to spacing apart the vapor barrier 18 and the second polymer film 20 from the substrate 22. As a result, thickness of the PSA 24 contributes to raising the dielectric breakdown voltage, thereby increasing protection against lightning strike.

A lower face of the polymer film 20 is provided with a surface treatment 26, such as without limitation a corona or plasma treatment. The PSA 24 may be laminated or cast directly onto the polymer film 20, as desired. As a result, the surface treatment 26 is provided to increase receptivity of the polymer film 20 to the PSA 24.

An adhesive 28 is affixed to one or both sides of the vapor barrier film 18. If desired, the adhesive 28 optionally may be applied between the polymer film 12 and the ink layer 14, or between the ink layer 14 and the polymer film 16, as desired. The adhesive 28 suitably is a standard laminating adhesive.

Total thickness of the appliqué 10 advantageously may be less than 4 mils. Around 1.5 mils to around 2 mils of thickness may be attributed to the PSA 24 and the adhesive 28. Likewise, around 2 mils of thickness may be attributed to the polymer films 12, 16, and 20, the ink layer 14, and the vapor barrier film 18. Because of such a thin profile, the appliqué 10 reduces weight.

It may be desirable to provide an increased thickness for the polymer film 20. An increased thickness of the polymer film 20 results in a higher dielectric breakdown voltage. With a greater thickness, the polymer film 20 can withstand an even higher electrical potential before undergoing dielectric breakdown, thereby increasing protection against lightning strike. However, increasing the thickness of the polymer film 20 also results in increased weight and/or decreased conformability to complex surface curvatures. Thus, a desire for increased dielectric strength for the polymer film 20 should be balanced with an increase in weight and a decrease in conformability.

In addition, the appliqué 10 advantageously may fatigue or crack like paint before significant disbond of the appliqué may occur, such as at points, like joints or fasteners used on aircraft structure, where air may attempt to exit. Further, the appliqué 10 is tatterable so that it will shred during flight of an aircraft, thereby limiting progress of any peels that may have initiated from maintenance damage or rain impingement at appliqué edges. The appliqué 10 is removable by peeling, when desired, for inspection or replacement, but advantageously remains adhered during flight.

Advantageously, the appliqué 10 can be fabricated at low cost. The appliqué 10 can be fabricated by commercial large-scale fabrication processes such as laminating, casting, and extruding, as desired, the polymer films 12, 16, and 20, and the vapor barrier film 18, that are all commercially available off-the-shelf or as made-to-order. As a result, the appliqué 10 can be fabricated in large quantities, thereby achieving economies of scale in fabrication costs. While such a construction may negligibly increase stiffness (because elongation may be slightly reduced), costs may be reduced by almost an order of magnitude over current appliqués.

From the foregoing discussion, multilayer construction of the appliqué 10 advantageously allows incorporation of the polymer film 12 as a top layer which provides high durability, UV stability, abrasion resistance, and superior gloss (whether high or low) using a defined texture. In addition, performance characteristics of the appliqué 10 are flexible. That is, performance and aesthetics of the appliqué 10 can be tailored to a desired application. This flexibility is achieved because the polymer film 16 or the ink layer 14 may be provided or omitted as desired. For example, the polymer film 16 provides strength and physical properties for coating application and removal. In addition, the polymer film 16 or the ink layer 14 may be provided as desired for operational characteristics, such as anti-static purposes, or for aesthetic purposes, such as providing color, graphic images or camouflage. To this end, any of the polymer films 12, 16, or 20, as desired for a particular application, can include surface patterns, and might include plasticizers, extenders, antioxidants, ultraviolet light stabilizers, dyes, pigments, emissivity agents (like silicon carbide), chopped or continuous fiber reinforcement, or the like, to provide desired color, gloss, hydrophobicity, anti-ice, or other surface characteristics. As a further example, optional chopped fibers can provide improved toughness in any of the polymer films 12, 16, or 20, and can provide anti-static properties in any of the polymer films 12 or 16 or the ink layer 14.

The appliqué 10 can be protected with single or double transfer protective paper or plastic film 30 to facilitate its application. In one exemplary embodiment, one sheet of protective paper overlies the PSA 24 (that is, the surface of the appliqué 10 that will interface and bond with the substrate 22) to protect the PSA 24 from dirt and to prevent the PSA 24 from inadvertently sticking to itself or other objects until the appliqué 10 is ready for installation. When the appliqué 10 is very thin, if desired the exposed surface of the polymer film 12 (that is, the topcoat) may also have similar protective paper 30 to reinforce it and to protect it during positioning and transfer. The protective paper 30 is peeled off following proper positioning. If desired, identifying information and instructions regarding how, where, and in what order to apply the appliqué 10 can be printed on the transfer paper 30 to simplify its placement and positioning. Alternately, the identifying information and instructions may be printed directly on the polymer film 12 (that is, the topcoat), if desired.

Figure 3:
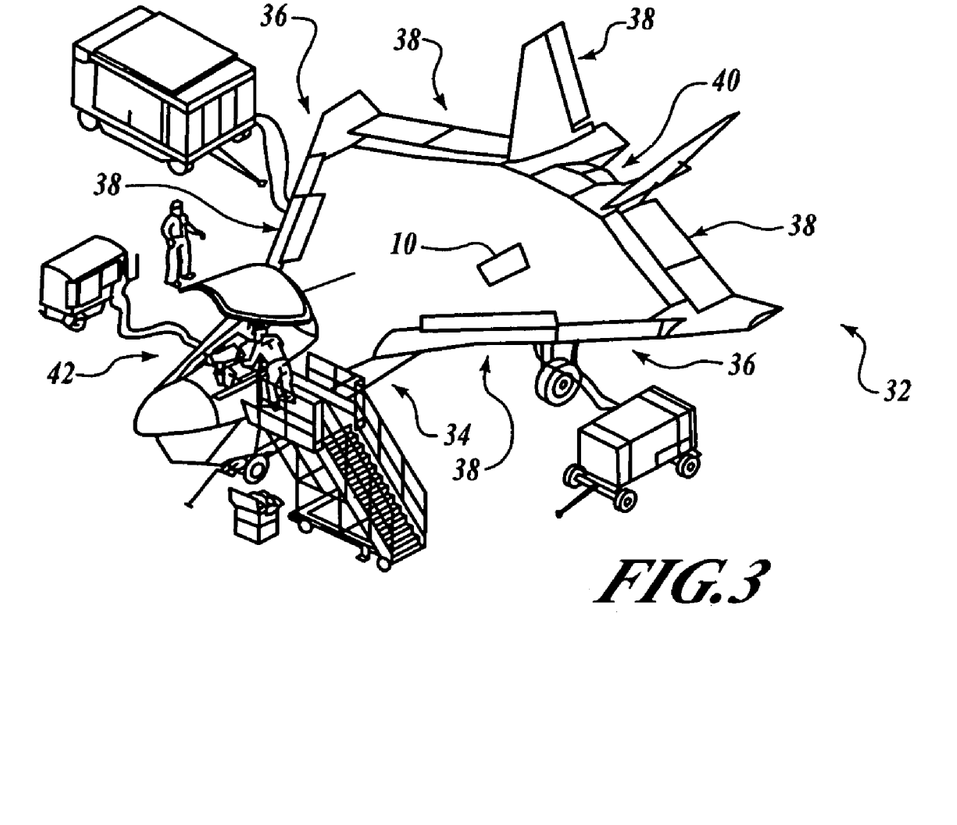
FIG. 3 is a perspective view of an aircraft covered with appliqués to provide a paintless coating.

Referring now to FIG. 3, an aircraft 32 advantageously is coated with a plurality of the appliqués 10. For purpose of clarity, only one of the appliqués 10 is shown. As is known the aircraft 32 includes a fuselage 34, a pair of wings 36, a plurality of control surfaces 38, at least one engine 40, and a cockpit 42. As is also known, the fuselage 34, wings, 36, and control surfaces 38 all have respective skins. Because aircraft are well known, further description of construction of the aircraft 32 is not necessary for an understanding of the present invention. According to the present invention, a plurality of the appliqués 10 is coated on the skins of the fuselage 34, wings, 36, and control surfaces 38. As a result, concurrent maintenance can occur on the aircraft 32, for example in the cockpit 42, while the appliqués 10 are inspected, repaired, or replaced, as desired.

Figure 4:
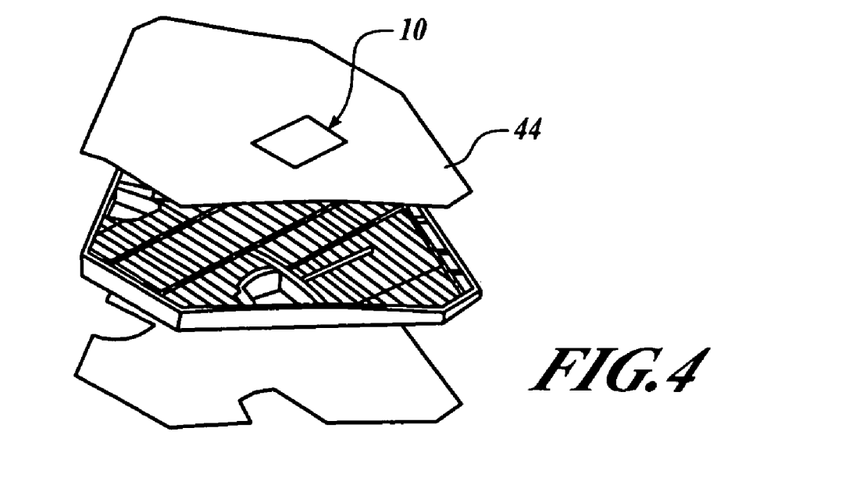
FIG. 4 is an exploded view of a wing-box of the aircraft of FIG. 3.

Referring now to FIG. 4, while curvature of the structure determines size and shape of the appliqué 10, a typical appliqué 10 applied to an upper wing skin 44 might be rectangular. To replace paint, the appliqués 10 cover all, substantially all, or merely a part of the surface of the aircraft 32 (FIG. 4) where paint would be used. Hot areas or areas particularly prone to erosion might require traditional treatments or coatings in addition to the appliqués 10.

Gores (not shown) are generally 2-dimensional, flat panels that are sized to conform to a 3-dimensional surface, similar to the sections of a baseball. During installation, the appliqué 10 often may be trimmed for achieving the final fit. The gores may have different thicknesses depending upon their intended location on the object. Thicker gores suitably are used in areas exposed to high wear or in impact zones.

The appliqués 10 typically are manufactured as multilayer "laminates" of flat materials that are flexible and readily bent. The material advantageously may be available substantially commercial off-the-shelf (COTS). Material of this form can easily be applied to both flat surfaces and simple curved surfaces such as cylinders, cones, and rolling bends. More complicated surfaces involving compound curvature can be covered if the material can be stretched or compressed to avoid wrinkling and tearing. If the material is not sufficiently deformable, cutting to permit overlapping, or wedge removal, as well as addition of darts, can be useful to extend coverage with a nominally flat appliqué 10. However, such approaches may be time consuming or may possibly damage the applied material if the material has any preferred orientation.

The appliqués 10 are typically made from flat material and accommodate curvature by inherent stretchiness and resilience of the appliqués 10. As discussed above, the appliqués 10 are suitably made from materials that are relatively forgiving and easy to work with. Flat appliqués can be used for cylindrical solids, flat surfaces, and any other large areas. Advantageously, it has been determined that an entire aircraft can be covered successfully using flat gores. The primary size of the appliqués 10 depends on the severity of the curvature of the surface they will cover. Smaller pieces are used in areas containing three dimensional curvature.

The appliqués 10 can be applied wet or dry using squeegees, mat knives, rubber rollers, wallpaper tools, and the like to place and smooth the films. Extracting any trapped air or water with a hypodermic syringe eliminates bubbles. Interfacing appliqués 10 usually are overlapped ¼ to ½ inch or more, but butt joints are possible. The extent of overlap is limited because of weight and cost factors, but also because the appliqués 10 may stick more securely to the substrate 22 than to one another depending on the PSA 24 and the polymer film 12.

The appliqués 10 can be used on most aerospace metals, including 2024, 6061, 7075, and other aluminum alloys; all titanium alloys; high strength (low carbon) steels like 4130, 4340, and 9310; nickel alloys like INCONEL 718; and magnesium alloys protected with a Dow conversion coating. In addition, the appliqués 10 can be used on composite structures. At the interface between carbon fiber-reinforced composites and metallic structure, the appliqués 10 reduce galvanic corrosion by reducing access of electrolytes to the metal surfaces. That is, the appliqués 10 seal moisture and aircraft fluids away from the metals (conductors).

Now that details have been set forth regarding components of the appliqué 10 and regarding exemplary system environments in which appliqués of the present invention may be used, various preferred and alternate implantations of appliqués according to the present invention will now be explained. Like reference numbers are used to refer to components that have been previously explained. For the sake of brevity, their details will not be repeated.

Figure 5:
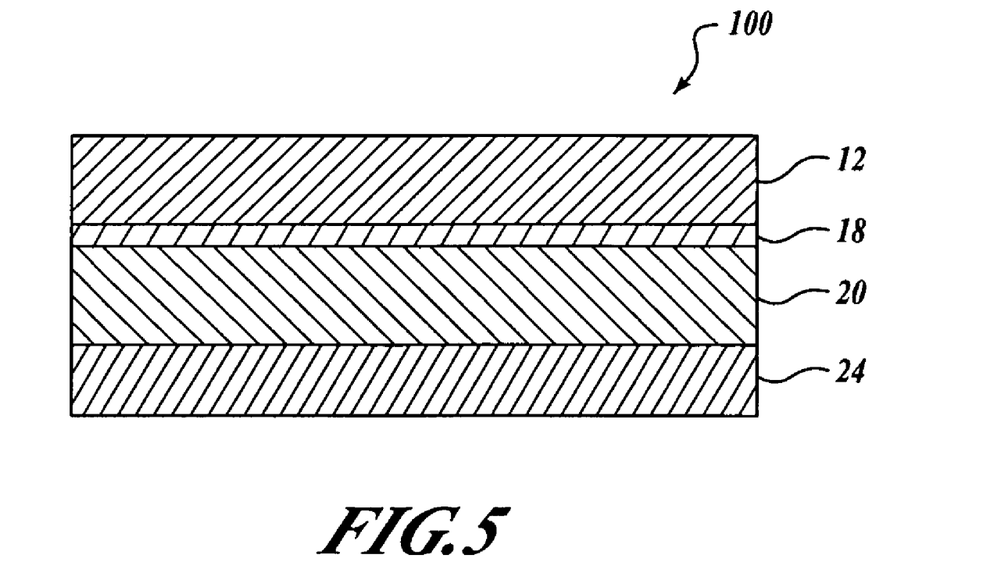
FIG. 5 is a schematic cross-section of an appliqué.

Referring now to FIG. 5, a presently preferred appliqué 100 includes the polymer film 12, the vapor barrier 18, the polymer film 20, and the PSA 24. In a presently preferred embodiment, the polymer film 12 includes a cast version of Boeing Material Specification 10-60 (BMS 10-60) polyurethane with a glossy texture or matte texture as desired. The vapor barrier 18 preferably includes a thin aluminum foil (approximately 0.3 mils thick). The polymer film 20 includes nylon or a laminate of PET and polyethylene. The PSA 24 preferably includes adhesive A8. The appliqué 100 may be painted over if desired for a particular application.

Figure 6:
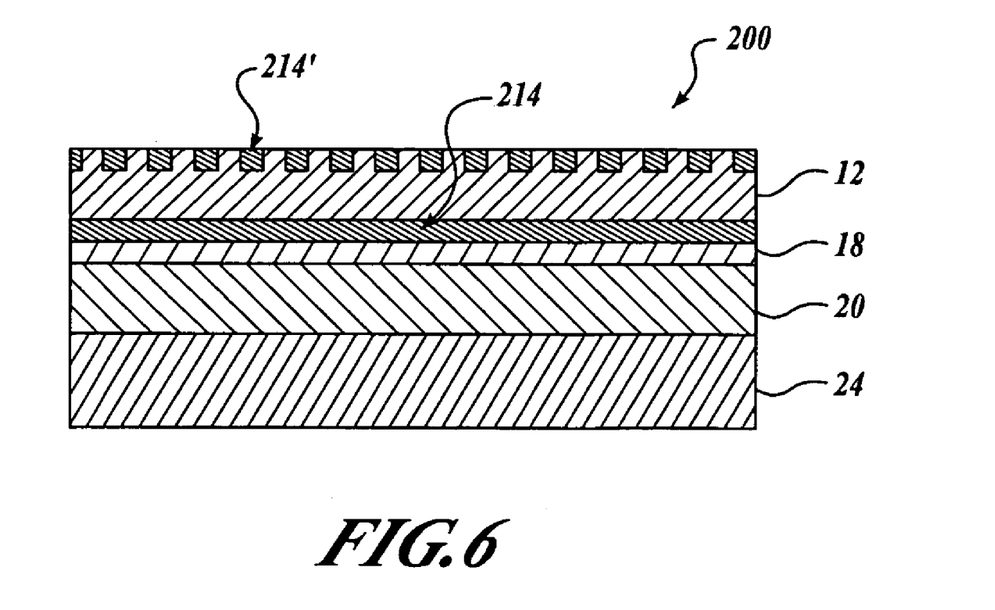
FIG. 6 is a schematic cross-section of another appliqué.

Referring now to FIG. 6, an appliqué 200 includes ink. The appliqué 200 includes the polymer film 12, the vapor barrier 18, the polymer film 20, and the PSA 24, all of which may be made from any of the materials discussed above in the context of the appliqué 10 (FIGS. 1 and 2). The ink may be provided as an ink layer 214 between the vapor barrier 18 and the polymer film 12 and/or an ink layer 214' provided above the polymer film 12. Details of the ink layers 214 and 214' are similar to those for the ink layer 14 (FIG. 2) and need not be repeated.

Figure 7:
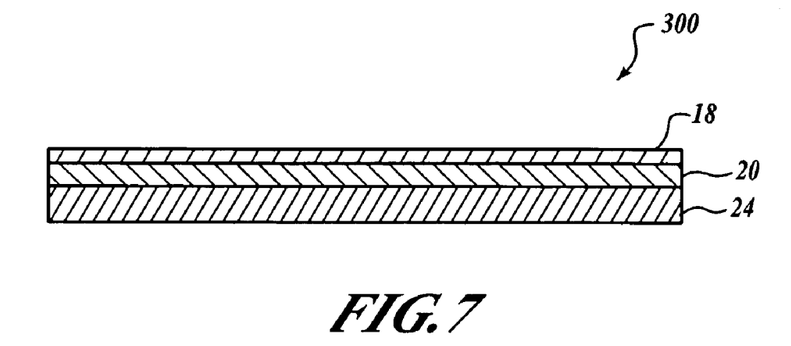
FIG. 7 is a schematic cross-section of another appliqué.

Referring now to FIG. 7, in an alternate embodiment an appliqué 300 includes the vapor barrier 18, the second polymer film 20, and the PSA 24, all of which may be made from any of the materials discussed above in the context of the appliqué 10 (FIGS. 1 and 2). It will be noted that the appliqué 300 does not include the polymer film 12. Instead, functionality of a "topcoat" may be provided by painting over the vapor barrier 18. Advantageously, the appliqué 300 provides lightning strike protection by cooperation of the vapor barrier 18 and the polymer film 20, as discussed above. In addition, applying paint (not shown) over the vapor barrier 18 permits appearance and aesthetics to be customized as desired for a particular application.

If desired, a protective treatment or primer could be applied to the vapor barrier 18 before painting. The protective treatment or primer can help protect the metal of the vapor barrier 18 from corrosion and/or can help enhance bonding of the paint to the vapor barrier. Given by way of non-limiting example, the protective treatment or primer can include anodizing, Alodine or other conversion coatings/treatments, electrodeposition, thin adhesives, primer, sol-gel, or the like.

Figure 8:
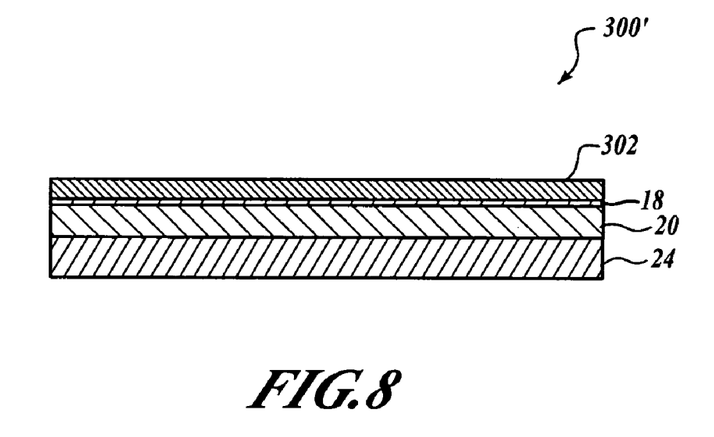
FIG. 8 is a schematic cross-section of another appliqué.

Referring now to FIG. 8, an appliqué 300' is similar to the appliqué 300 (FIG. 7) and includes the vapor barrier 18, the second polymer film 20, and the PSA 24, all of which may be made from any of the materials discussed above in the context of the appliqué 10 (FIGS. 1 and 2). The appliqué 300' also does not include the polymer film 12. Advantageously, a maskant 302 overlays and covers the vapor barrier 18. The maskant 302 suitably is removable. The use of the protective removable maskant 302 over the vapor barrier 18 advantageously helps maintain quality and integrity of the appliqué 300' during storage and installation. In addition, when the optional protective treatment or primer is used, the removable maskant 302 can help maintain the quality and bondability of the protective treatment or primer. The protective maskant 302 is removed prior to painting and/or lap joint installation. The maskant 302 may be left intact after installation to the extent possible, thereby providing protection for the appliqué 300' during part assembly and shipping. The removable maskant 302 typically may be a low cost polymer film, such as polyethylene, polypropylene, or polyester. Alternately, the maskant 302 may be paper with a low-tack pressure sensitive adhesive, thereby allowing the maskant 302 to be preferentially removed from the appliqué 300' after installation.

Figure 9:
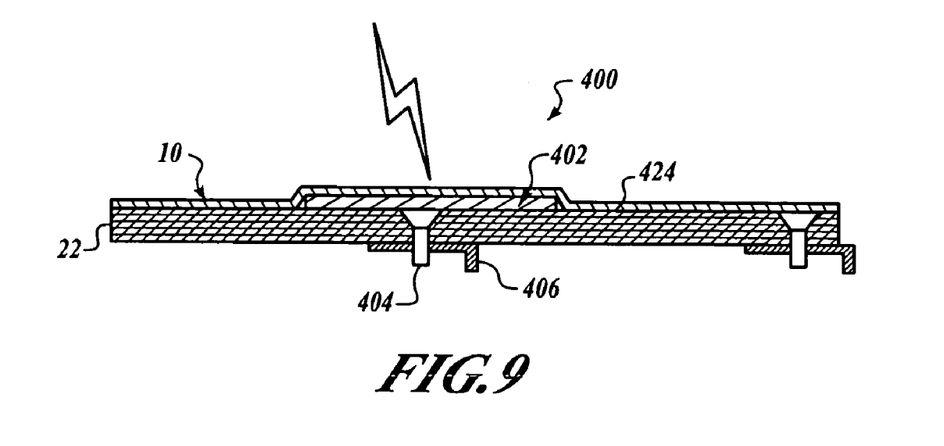
FIG. 9 is a side view of an appliqué covering a fastener.

Referring now to FIG. 9, in another alternate embodiment an appliqué assembly 400 provides increased lightning strike protection. It has been shown that electrical energy, such as that from lightning strikes, preferentially seeks fasteners that extend through a substrate and fasten the substrate to underlying structure. This is because the fastener presents a path to electrical "ground" (that is, the underlying structure) either directly or via graphite fibers that are exposed at the perimeter of the fastener hole. Although the polymer film 20 of the appliqué coating 10 can provide sufficient dielectric isolation between the metal foil 18 and the underlying aircraft structure 22, including fasteners, the overall weight of the appliqué coating 10 may be reduced by reducing the thickness of the polymer film 20, and preferably including additional dielectric material and/or voltage separation at fasteners or other discontinuities. Use of dielectric isolators or spacers is typical of many types of electrical products and systems, and can be used in concert with the appliqué 10 to provide additional weight savings. In FIG. 9 an additional dielectric layer 402 is provided on top of a fastener 404 that extends through the substrate 22. The fastener is attached to structure 406. Given by way of non-limiting example, the substrate 22 may be an aircraft skin, such as a wing skin, made from a composite material or metal; the fastener 404 may be any acceptable fastener as desired; and the structure 406 may be a stringer, a shear tie, or a rib. By interposing another layer of dielectric material between the lightning attachment point and the fastener 404, the dielectric layer 402 advantageously increases the maximum electrical potential between the exterior surface of the appliqué and the fastener 404, thereby reducing the likelihood of breakdown at the fastener. Thus, the appliqué assembly 400 is well-suited for covering fasteners that extend into aircraft wing boxes that are wetted with fuel.

The dielectric layer 402 suitably is made from the same material as the polymer film 20 (FIG. 2). The dielectric layer 402 may be cut into any shape as desired to cover the fastener 404. Given by way of non-limiting example, the dielectric layer 402 may be cut into a strip or may be cut into a round shape that at least covers the head of the fastener 404. In order to help the dielectric layer 402 adhere to the substrate 22 and the fastener 404, a PSA 424 may be applied to an underside of the dielectric layer 402. The PSA 424 suitably is similar to the PSA 24 (FIG. 2), and details regarding its construction need not be repeated.

Alternate implementations also may provide for increased lightning strike protection in the vicinity of fasteners. For example, thickness of the polymer film 20 could be increased over a fastener, or an extra layer of the polymer film 20 could be provided over a fastener. Further, materials with high dielectric breakdown properties, such as PET or nylon or perfluoroalkoxy (PFA), may be used as the polymer film 20 over a fastener. Also, thickness of the PSA 24 may be increased over a fastener to provide additional spacing and therefore voltage separation.

Figure 10:
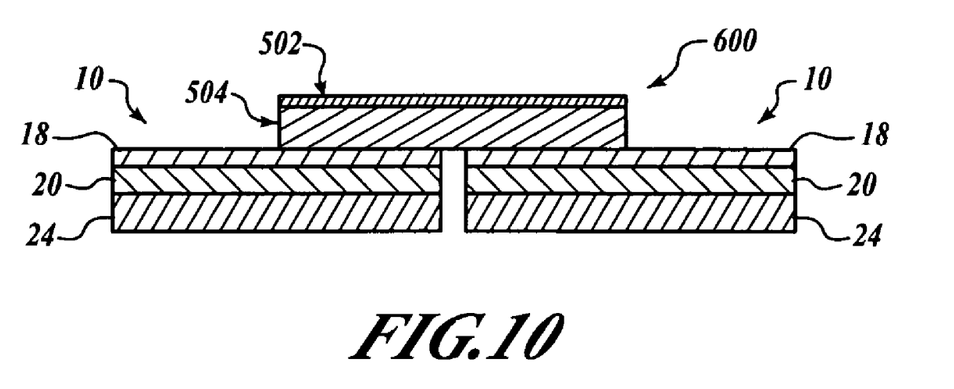
FIG. 10 is a side view of abutting appliqués.

Referring now to FIG. 10, an edge finish 600 provides a physical barrier for butt joints between adjacent appliqués 10. The edge finish 600 advantageously protects the underlying substrate (not shown) from ultraviolet (UV) radiation, moisture, rain, air impingement, and the like. The edge finish 600 may also be used with lap joints between overlapping appliqués 10.

The edge finish 600 suitably includes a metal foil 502 and a polymer film 504 that underlies the metal foil 502. Alternately, the foil 502 may underlay the polymer film 504. Alternately, the edge finish 600 may include either the metal foil 502 or the polymer film 504. An adhesive (not shown to enhance clarity) provided on an underside of the edge finish 600 affixes the edge finish 600 to the appliqués 10 or other structures as desired. The adhesive may be a PSA, a thermosetting adhesive, or a thermoplastic/hot melt adhesive, as desired for a particular application. Other "wet" sealant products, such as for example metal filled epoxies or polysulfides, may also be used to provide physical barrier properties.

The appliqués 10 shown in FIG. 10 illustrate only the vapor barrier 18, the polymer film 20, and the PSA 24 by way of non-limiting example. Any of the components of the appliqué 10 (FIG. 2) may be included as desired for a particular purpose. The non-limiting example of the appliqué 10 shown in FIG. 10 is provided for illustrative purposes only, and additional components are not shown for purposes of clarity of the drawing.

Figure 11:
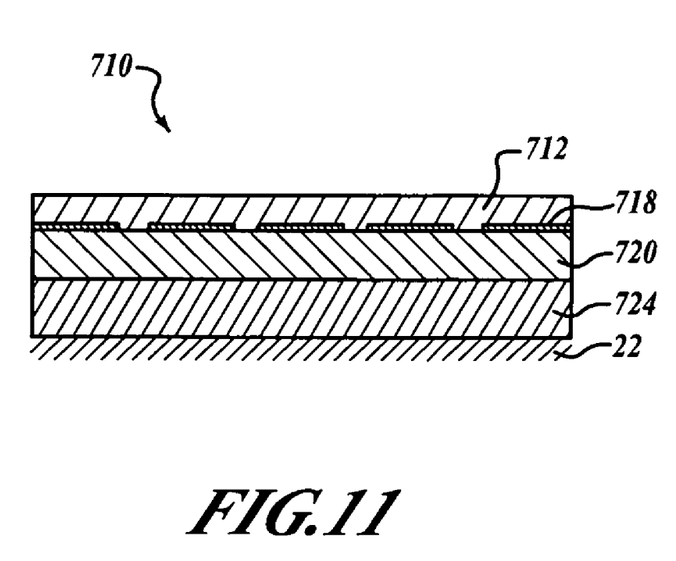
FIG. 11 is a schematic cross-section of an appliqué with a patterned metal foil.
Figure 12A:
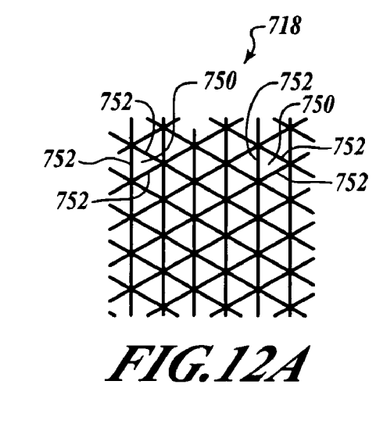
FIGS. 12A-12F are top plan views of non-limiting examples of patterned metal foils.
Figure 12B:
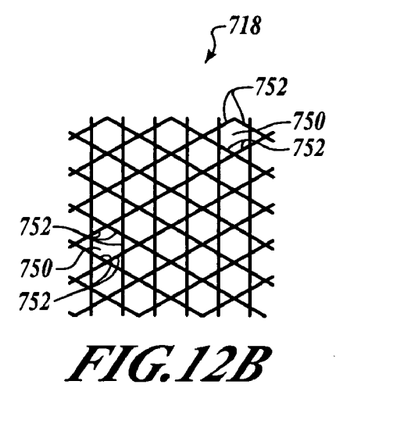
Figure 12C:
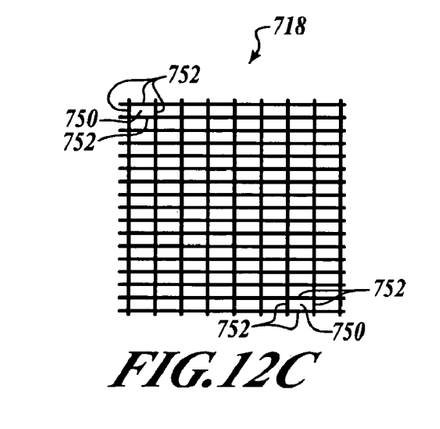
Figure 12D:
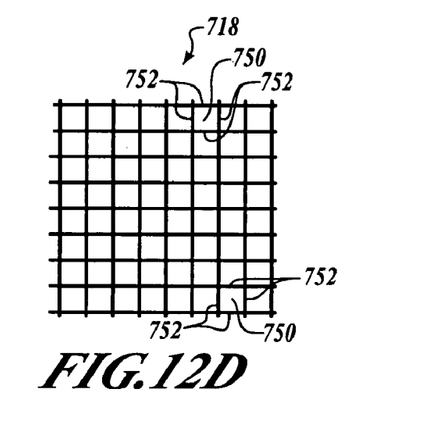
Figure 12E:
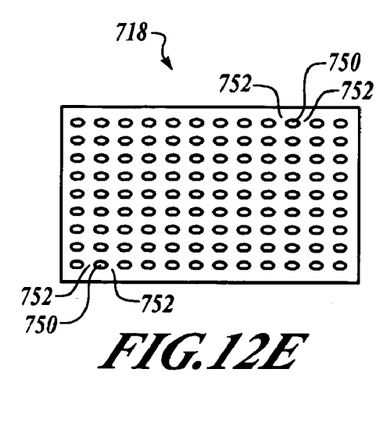
Figure 12F:
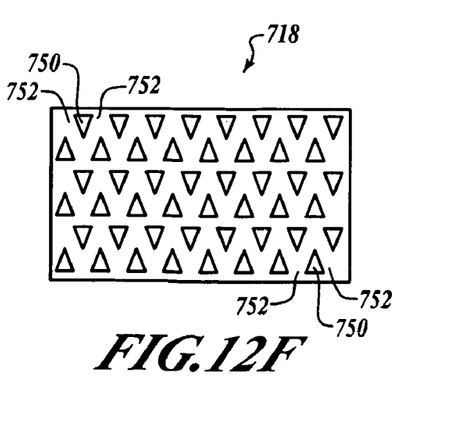

Referring now to FIG. 11 and given by way of overview, another exemplary embodiment forms an appliqué or overlay 710 of patterned metal foil 718 above the substrate 22 to be protected. This embodiment is a two-dimensional lightning diverter overlay that can transport the energy of a lightning strike over a wide area in multiple directions on a surface. The patterned metal foil 718 supports development of localized coronas during a lightning strike. The localized coronas transport the energy of a lightning strike above the surface of the substrate 22 with very limited removal of the metal foil 718 from the location of attachment of the lightning strike.

Still referring to FIG. 11, the exemplary lightning diverter overlay 710 includes the patterned metal foil 718 and a polymer film 720 underlying the patterned metal foil. A topcoat 712 overlying the patterned metal foil 718 may be provided as a layer of paint or as a polymer film. An ink layer (not shown) may be provided if desired, for aesthetic and/or anti-static purposes between the patterned metal foil 718 and the topcoat 712, or on the exterior of the overlay 710, or if desired may replace the topcoat 712. An adhesive 724, such as a pressure sensitive adhesive, underlying the polymer film 720 may be provided to affix the lightning diverter overlay 710 to the substrate 22. Details of the lightning diverter overlay 710 will now be explained.

The polymer film 720 may be the same polymer film as the polymer film 20 (FIG. 2). Therefore, details of its construction need not be repeated.

The adhesive 724 may be the same adhesive as the adhesive 24 (FIG. 2). Therefore, details of its construction need not be repeated.

The metal foil that is patterned to form the resultant patterned metal foil 718 may be the same metal foil as the metal foil 18 (FIG. 2). Referring additionally to FIGS. 12A through 12F, the patterned metal foil 18 may be patterned in any pattern whatsoever as desired. Patterns in the patterned metal foil 718 can be formed by any acceptable process, including without limitation laser scribing a solid foil, electroforming, electroless or electroplating, etching, chemical-mechanical-polishing (CMP), and various lithography processes such as photolithography.

Patterns can be formed in a variety of shapes and sizes, and can be used in combination with solid foil. Thus, the patterns shown in FIGS. 12A through 12E are exemplary patterns that are given by way of example without limitation. In one embodiment, the patterned metal foil 718 includes sections 750 of the metal foil. Corners at the ends of sides of adjacent sections 750 act as radiators that create localized coronas of plasma in the event of a lightning strike. The lightning expends energy in vaporizing the metal foil and ionizing air molecules (that is, creating plasma). The lightning's energy travels along the surface of the metal foil 718, generating plasma along the way. Every time the energy of the lightning creates plasma in the form of localized coronas at corners at the ends of sides of adjacent sections 750, further energy of the lightning is consumed. Therefore, as the energy of the lightning strike is diverted over a wide area by the lightning diverter overlay: (1) the energy has remained above the surface of the substrate 22, such as an aircraft, and above the polymer layer 720 and has not penetrated the overlay 710 or underlying structure; (2) the energy traveling on the surface has been distributed in all desired directions, thereby reducing the current flow in any one location; and (3) the total energy traveling on the surface has been reduced (because the energy of the lightning has been consumed by formation of localized coronas). Thus, by the time the electrical energy resulting from the lightning strike reaches an edge of the lightning diverter overlay 710, the energy of the lightning may be significantly reduced. This reduction in energy of the lightning that has been diverted over a wide area over the surface of the lightning diverter overlay 710 may help mitigate damage caused by lightning strikes.

Regardless of shape of the section 750 and given by way of non-limiting example, sides of the section 750 suitably may have lengths within a range from around 30 mil to around 50 mil. However, the sides of the sections 750 may have any length as desired for a particular application. Also given by way of non-limiting example, the thickness of the sections 750 may be up to around 1-2 mils. However, the sections 750 may have any thickness as desired for a particular application.

The sections 750 are separated from each other by areas 752. In one embodiment, the areas 752 are areas of dielectric polymer or metal foil modified to have a high sheet resistance. Given by way of non-limiting example, the areas 752 suitably have widths in a range between around ½ mil to around 1½ mils. However, the areas 752 may have any thickness as desired for a particular application. As an example and without limitation, the areas 752 suitably are scribe lines.

Thickness of the areas 752 is different than thickness of the sections 750. For example, thickness of the areas 752 in this embodiment may be a finite, non-zero thickness that is thinner than the thickness of the sections 750. Given by way of non-limiting example, the areas 752 may have a thickness that is in a range on the order of around 0 to thousands (such as around 10,000) of Angstrom units (Å). The areas 752 in this embodiment desirably have a high sheet resistance. For example, the sheet resistance of the areas 752 may be on the order of around 100 Ohms per square up to 1,000,000 Ohms per square or more. The purpose of having high sheet resistance in the areas 752 between the sections 750 is to force the generation of coronas rather than conducting the energy electrically within the material of the sections 752. The coronas provide a region above the surface where the energy is preferentially transported.

However, in another embodiment the sections 750 are embodied as described above, but the areas 752 are voids (that is, the areas 752 are areas of air). Therefore, in this embodiment the thickness of the areas 752 is zero. If a topcoat is used, it will be noted that the topcoat will likely fill in this region of voids between the sections 750. This embodiment therefore provides even higher electrical resistance between the sections 750 than does the embodiment described above in which the areas 752 have a non-zero thickness. The width of the voids suitably is between around ½ mil and around 1½ mil, as described above for the areas 752. However, the voids may have any width as desired for a particular application. For example, for radome or antenna protection, the areas 752 may be wider to enhance radar transmission. The patterned metal foil 718 is bonded below to the polymer film 720 and is typically encapsulated by the topcoat 712 above. The patterned metal foil 718 is bonded to the polymer film 720 first and then the areas 752, such as scribe lines, are laser scribed so the bond remains and the pattern is determined by the scribing design.

In a further embodiment, the sections 750 may be voids of any desired shape, and therefore the thickness of the sections 750 is zero. In this embodiment, the areas 752 may be embodied as an electrically conductive grid or as an electrically conductive matrix of intersecting lines or patches having finite widths and a non-zero thickness. The areas 752 may have widths between around ½ mil and around 1½ mil, as described above for other embodiments. However, as described above, the sections 750 and the areas 752 may have any width as desired for a particular application.

In addition to providing protection against lightning strikes, this embodiment in which the sections 750 are voids advantageously has been shown to attenuate radiofrequency (RF) energy by reflecting the RF energy. Furthermore, when the topcoat 712 and the polymer film 720 are clear the overlay 710 can be substantially optically transparent. Such an embodiment is especially well-suited for use as an RF shielding layer affixed to a window. An exemplary application of such an optically transparent overlay is set forth in U.S. patent application Ser. No. 10/435,785 filed May 12, 2003, and published on Nov. 18, 2004, as Publication No. US-2004-0229607 A1, for "Wireless Communication Inside Shielded Envelope" by Michael de La Chapelle et al. and assigned to The Boeing Company, the entire contents of which are incorporated by reference.

The topcoat 712 may be the same polymer film as the polymer film 12 (FIG. 2) or may be any acceptable paint as desired for a particular application. If desired, semiconductor particulates may be dispersed throughout portions of the topcoat 712 to contribute to instantaneous generation of localized coronas at the surface. In high-current, high-voltage conditions (such as those that result from a lightning strike), the semiconductor particulates can become electrically conductive, thereby contributing to the substantially instantaneous generation of coronas at the surface. In embodiments in which the sections 750 are areas of metal foil, the semiconductor particulates are dispersed in portions of the topcoat 712 to overlay and at least partially fill the areas 752 with the semiconductor particulates. In embodiments in which the sections 750 are voids, the semiconductor particulates are dispersed in portions of the topcoat 712 to overlay and at least partially fill the sections 750 (that is, the voids) with the semiconductor particulates. The semiconductor particulates may be any semiconductor material as desired, such as without limitation Silicon (Si), Germanium (Ge), conductive metal oxides such as Tin Oxide ($SnO_x$), and the like.

An ink layer (not shown) may be provided between the patterned metal foil 718 and the topcoat 712 or on the exterior, if desired, for aesthetic and/or anti-static purposes. The ink layer (not shown) may be the same as the ink layer 14 (FIG. 2). Therefore, details of its construction need not be repeated.

As described above, the patterns in the patterned metal foil 718 foil can help direct electrical currents (due to lightning strikes) traveling across the surface of the lightning diverter overlay 710 through the pattern itself. In addition and as described below, any electrical currents due to lightning strikes can also be directed by juxtaposition of patterned and unpatterned metal foil.

Figure 13:
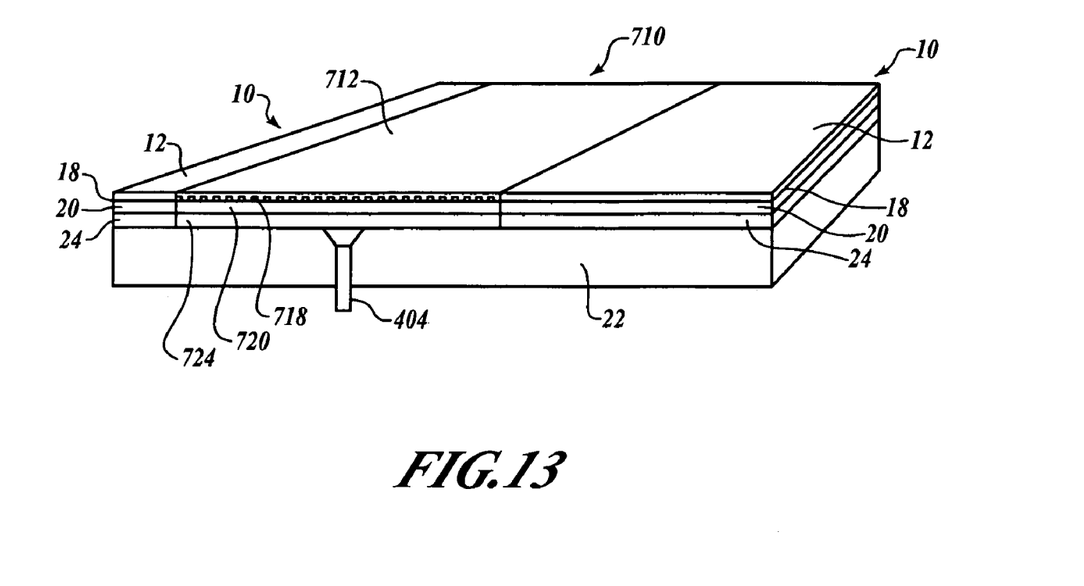
FIG. 13 is a perspective view of an appliqué with patterned metal foil overlying a fastener.

The patterned metal foil 718 may be patterned throughout, or the metal foil may be partially patterned. Referring now to FIG. 13, the lightning diverter overlay 710 affixed over the fastener 404 and appliqués 10 are affixed over the substrate 22 on both sides of the lightning diverter overlay 710. This arrangement may be realized as simply as patterning the metal foil 718 as indicated for the lightning diverter overlay 710 and leaving the metal foil 18 unpatterned as indicated for the appliqués 10. The rest of the construction of the lightning diverter overlay 710 and the appliqué 10 advantageously is the same. With this arrangement, if there is a direct strike on the region of the patterned metal foil 718 over a row of the fasteners 404, the lightning diverter overlay 710 will protect the underlying structure of the substrate 22 via the corona effect described above. If the lightning attaches elsewhere, resulting electrical current will prefer to flow in regions of the solid metal foil 18 in the appliqués 10 rather than in the regions of the patterned metal foil 718. This arrangement advantageously may direct current flow from a lightning strike to create a robust lightning protection scheme for aircraft.

Figure 14A:
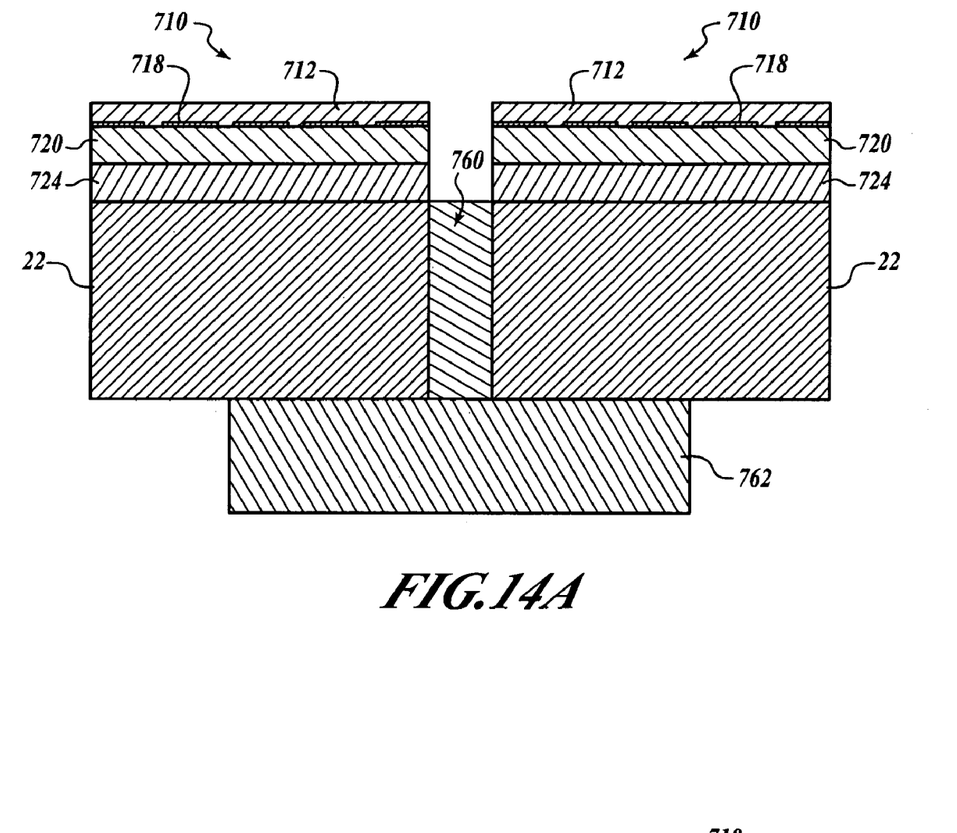
FIG. 14A is a side view of appliqués with patterned metal foils overlying adjacent panels.

Referring now to FIG. 14A, the corona effect described above advantageously may enable the lightning diverter overlays 710 to help electrical currents from lightning strikes cross or jump a gap 760 between adjacent panels of the substrate 22 above a substructure 762. For example, the gap 760 may exist between composite skin panels or between a door and a panel, and the like. As discussed above, a majority of the lightning's energy can be made to travel in localized coronas above the surface of one lightning diverter overlay 710 by radiating from corners of adjacent sections 750 (FIGS. 12A-12F) within the same lightning diverter overlay 710. Likewise, the lightning's energy may cross or jump the gap 760. In this case, the ends of the patterned metal foil 718 of adjacent lightning diverter overlays 710 act as radiators that create localized coronas of plasma in the event of a lightning strike. The localized corona extends across the gap 760, thereby enabling the energy of the lightning strike to cross or jump the gap 760 and continue to be diverted over a wide area. As described above, this diversion over a wide area consumes energy of the lightning by creating localized coronas of plasma, thereby helping mitigate possibility of damage due to lightning strikes. It may be desirable to maintain a dielectric separation at the gap 760 between the surface and the graphite fibers or fasteners 404 (FIG. 13), to the extent that it remains preferable for energy to stay on the surface or in the corona rather than to breakdown to the graphite or other underlying conductive structure.

Figure 14B:
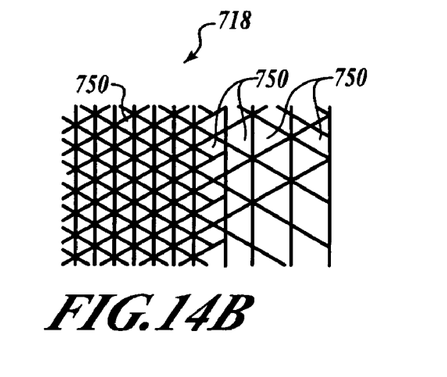
FIGS. 14B and 14C are top plan views of non-limiting examples of varying patterns in metal foils.
Figure 14C:
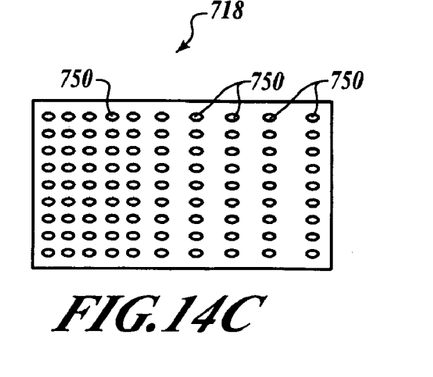

Referring additionally to FIGS. 14B and 14C, ability of the lightning diverter overlays 710 to help energy of the lightning cross or jump over the gap 760 may be enhanced by varying the pattern of the sections 750 and the areas 752 approaching the gap 760. For example, the pattern may be varied by spacing out the sections 750 to match size of the gap 760.

Referring back to FIGS. 11 and 12A-12F, the overlay 710 advantageously may be constructed such that it is sufficiently transparent to radar waves. Therefore, the overlay 710 may be applied to a radome or antenna cover. It will be noted that this application of the overlay 710 is applicable in embodiments wherein the sections 750 are sections of metal foil (but is not applicable in embodiments wherein the sections 750 are voids). The smaller the sections 750 and the wider the areas 752, the more transparent the overlay 710 is to radar waves. Transparency to radar waves of the overlay 710 may also depend upon other factors, such as radar band used, distance between a radar antenna and the radome, and the dielectric strength of the polymer film 720.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An overlay comprising:
 a first layer including a plurality of physically discontinuous metal foil elements, wherein each physically discontinuous metal foil element includes a separate section of metal foil that is physically separated from each other section of metal foil in the first layer;
 a polymer film underlying the first layer and configured to be applied between the first layer and a surface of a substrate; and
 a polymer topcoat overlying the first layer and at least partially filling an area between two or more of the plurality of physically discontinuous metal foil elements.

2. The overlay of claim 1, wherein the polymer topcoat includes semiconductor particulates dispersed therein.

3. The overlay of claim 1, further comprising an adhesive underlying the polymer film.

4. The overlay of claim 1, wherein sides of the separate sections of metal foil act as radiators in a presence of electrical energy to disperse the electrical energy by generating coronas between adjacent sections of metal foil.

5. The overlay of claim 1, wherein the physically discontinuous metal foil elements have a triangular shape.

6. The overlay of claim 1, wherein areas between the physically discontinuous metal foil elements include a dielectric polymer.

7. The overlay of claim 1, further comprising one or more continuous regions of metal foil adjacent to two or more of the physically discontinuous metal foil elements, wherein electrical energy preferentially flows in the one or more continuous regions of metal foil rather than between the two or more of the physically discontinuous metal foil elements.

8. The overlay of claim 1, wherein the polymer topcoat is porous and optically transparent.

9. The overlay of claim 1, wherein a total thickness of the overlay is less than 4 mils.

10. The overlay of claim 2, wherein the semiconductor particulates are dispersed throughout the polymer topcoat and are electrically conductive in high voltage, high current conditions to facilitate generation of coronas.

11. The overlay of claim 10, wherein conductive fibers are dispersed within the polymer topcoat.

12. An overlay comprising:
 a patterned metal foil layer including:
  a plurality of physically discontinuous pieces of metal foil that are separated from each other, wherein sides of adjacent physically discontinuous pieces of the plurality of physically discontinuous pieces of metal foil act as radiators in a presence of electrical energy to disperse the electrical energy by generating coronas between the adjacent physically discontinuous pieces of metal foil; and
  a plurality of areas separating the physically discontinuous pieces of metal foil;
 a polymer film underlying the patterned metal foil layer; and
 a polymer topcoat overlying the patterned metal foil layer and at least partially filling at least one of the plurality of areas separating the physically discontinuous pieces of metal foil.

13. The overlay of claim 12, wherein semiconductor particulates are dispersed throughout the polymer topcoat, wherein the semiconductor particulates are electrically conductive in high voltage, high current conditions to facilitate generation of the coronas.

14. The overlay of claim 12, further comprising an adhesive underlying the polymer film.

15. An overlay comprising:
 a patterned metal foil including a plurality of physically discontinuous and separate sections of the metal foil and a plurality of substantially continuous areas of high sheet resistance between the physically discontinuous and separate sections of the metal foil;
 a first polymer film underlying the patterned metal foil;
 a polymer topcoat overlying the patterned metal foil;
 a pressure sensitive adhesive underlying the first polymer film; and
 a first transfer layer underlying the pressure sensitive adhesive, wherein the first transfer layer is removable during installation of the overlay to a substrate, and wherein removal of the first transfer layer exposes the pressure sensitive adhesive.

16. The overlay of claim 15, wherein the plurality of substantially continuous areas of high sheet resistance define a plurality of intersecting lines between the physically discontinuous and separate sections of the metal foil.

17. The overlay of claim 15, further comprising a second transfer layer overlying the polymer topcoat.

18. The overlay of claim 15, further comprising:
 a second polymer film between the polymer topcoat and the patterned metal foil, wherein the second polymer film at least partially fills an area between the plurality of substantially continuous areas of high sheet resistance between the physically discontinuous and separate sections of the metal foil;
 a first adhesive layer between the first polymer film and the patterned metal foil; and
 a second adhesive layer between the second polymer film and the patterned metal foil.

19. The overlay of claim 18, further comprising a decorative layer between the polymer topcoat and the second polymer film.

20. A method of forming an overlay for a substrate, the method comprising:
 applying a first polymer film to a first side of a metal foil, wherein the metal foil includes a plurality of physically discontinuous sections of metal foil separated from each other by substantially continuous areas of high resistance; and
 applying a polymer topcoat to a second side of the metal foil, wherein the polymer topcoat at least partially fills an area between two or more of the plurality of physically discontinuous sections of metal foil.

21. The method of claim 20, wherein semiconductor particulates are dispersed throughout the polymer topcoat, wherein the semiconductor particulates become electrically conductive in high voltage, high current conditions to facilitate generation of coronas over a surface of the metal foil.

22. The method of claim 20, wherein the metal foil defines a plurality of voids separating the plurality of physically discontinuous sections of metal foil.

* * * * *